United States Patent
Koneru et al.

(10) Patent No.: US 11,977,880 B2
(45) Date of Patent: May 7, 2024

(54) SYSTEMS AND METHODS FOR COMPARING VERSIONS OF A VIRTUAL ASSISTANT

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Santhosh Kumar Myadam, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 128 days.

(21) Appl. No.: 17/748,168

(22) Filed: May 19, 2022

(65) Prior Publication Data
US 2023/0376305 A1 Nov. 23, 2023

(51) Int. Cl.
*G06F 8/71* (2018.01)

(52) U.S. Cl.
CPC ........................... *G06F 8/71* (2013.01)

(58) Field of Classification Search
CPC ............................................................ G06F 8/71
See application file for complete search history.

(56) References Cited

U.S. PATENT DOCUMENTS

| | | | | |
|---|---|---|---|---|
| 11,526,533 B2* | 12/2022 | Baek | | G06F 16/27 |
| 2004/0210885 A1* | 10/2004 | Wang | | G06F 8/71 |
| | | | | 717/130 |
| 2008/0148235 A1* | 6/2008 | Foresti | | G06F 11/3604 |
| | | | | 717/125 |
| 2009/0199175 A1* | 8/2009 | Keller | | G06F 9/455 |
| | | | | 717/178 |
| 2012/0131566 A1* | 5/2012 | Morgan | | G06F 8/65 |
| | | | | 717/170 |
| 2016/0034273 A1* | 2/2016 | Leupold | | G06F 8/71 |
| | | | | 717/122 |
| 2017/0109331 A1* | 4/2017 | Bonazzoli | | G06F 40/205 |
| 2018/0136930 A1* | 5/2018 | Saxena | | G06F 8/75 |
| 2019/0354359 A1* | 11/2019 | Olderdissen | | G06F 8/654 |

* cited by examiner

*Primary Examiner* — Phillip H Nguyen
(74) *Attorney, Agent, or Firm* — Troutman Pepper Hamilton Sanders LLP (Rochester)

(57) ABSTRACT

A virtual assistant server receives a selection of at least two versions of a virtual assistant for comparison from a client device and compares metadata corresponding to each component of the at least two versions. The virtual assistant server presents to the client device, based on the compared metadata, a list of components of the at least two versions and a type of change made to one or more components of the list of components. The virtual assistant server receives from the client device, a selection corresponding to the one or more components of the list of components and presents to the client device, a comparison of definitions of the at least two versions of the selected one or more components of the list of components.

21 Claims, 10 Drawing Sheets

Select Another Version to Compare

Selected Version

| Published Version: February 11, 2022 5:04:55 | v4 |

Select Another

| NAME | DESCRIPTION |
|---|---|
| ⦿ Published Version: February 3, 2022 9:01:38 | v3 |
| ○ Published Version: December 8, 2021 11:25:21 | v3 |
| ○ Published Version: December 8, 2021 11:22:48 | v1 |

[ Proceed ]  [ Cancel ]

*FIG. 4A*

Version(3)

| Intent - Book flight | | |
|---|---|---|
| | node name | Book flight |
| | unique identifier | 1234kmn12345 |
| | hash | 3458048f0a7930a59b0dc |
| | node name | Source |
| | unique identifier | 1876z9n21378 |
| | hash | 8a7dbb9e2e57094e8aa7 |
| | node name | destination |
| | unique identifier | 2546ak971823 |
| | hash | 29542a3ebi40405a51m1 |
| Training Intelligence Settings | | |

Version(4)

| Intent - Book flight | | |
|---|---|---|
| | node name | Book flight |
| | unique identifier | 1234kmn12345 |
| | hash | a98nsf923849120nsd12 |
| | node name | Source |
| | unique identifier | 1876z9n21378 |
| | hash | 9ie0293nb1j12l3i41km12 |
| | node name | destination |
| | unique identifier | 2546ak971823 |
| | hash | o912kno12l4n6b6m1l2m |
| Training Intelligence Settings | | |

Change Logs

Total Differences: 4  ☑ 2 Removals  ☑ 2 Updates

Version: Published Version: February 11, 2022 5:04:55

```
"component": [
  {
    "v":0,
    "applyDefaultTemplate": false,
    "editLocked": false,
    "entityFields": [
      "cityAdvanced": [
      ]
    ],
    "entityType": "airport",
    "errorMessage": [
      {
        "channel": "default",
        "text": "We%20have%20encountered%2
        "type": "basic"
      }
    ],
    "isArray": false,
    "label": "source"
```

Version: Published Version: December 8, 2021 11:25:21

```
"component": [
  {
    "v":0,
    "applyDefaultTemplate": false,
    "editLocked": false,
    "entityFields": [
      "cityAdvanced": [
      ]
    ],                                      462
    "entityType": "airport",
    "errorMessage": [
      {                                     464
        "channel": "default",
        "text": "I'm sorry, I am unable to
        "type": "basic"
      }
    ],
    "isArray": false,
    "label": "source"
```

SYSTEMS AND METHODS FOR COMPARING VERSIONS OF A VIRTUAL ASSISTANT

FIELD

This technology generally relates to virtual assistants, and more particularly to methods, systems, and non-transitory computer-readable media for comparing versions of a virtual assistant.

BACKGROUND

Often, multiple stakeholders such as developers, business analysts, or administrators are involved in creating a virtual assistant. It is important for all the stakeholders to understand the changes made to a version of the virtual assistant. In one example, functionality of the virtual assistant is not consistent after upgrading to a new version and a developer needs to understand which change(s) in the new version caused the inconsistency. In another example, in a collaborative development environment, an administrator needs to understand the changes made to the configuration of the virtual assistant by one or more developers The current virtual assistant development platforms and interfaces do not provide methods to efficiently understand changes made to a virtual assistant. In one example, the developers may export definitions of the different versions of the virtual assistant and use manual methods of comparing the different versions. In another example, the developers may export the virtual assistant definitions of different versions of the virtual assistant and use generic third-party code comparison tools which are not tailored for virtual assistants. These methods are also time taking and not efficient. Hence there is a need to provide an efficient way for all the stakeholders to understand changes made to the virtual assistant.

SUMMARY

In an example, the present disclosure relates to a method for comparing versions of a virtual assistant. The method includes receiving, by a virtual assistant server, a selection of at least two versions of a virtual assistant for comparison from a client device. Metadata corresponding to each component of the at least two versions is then compared. Based on the compared metadata, a list of components of the at least two versions and a type of change made to one or more components of the list of components is presented to the client device. A selection corresponding to one or more components of the list of components is received from the client device. Subsequently, a comparison of definitions of the at least two versions of the selected one or more components of the list of components is presented to the client device.

In another example, the present disclosure relates to a virtual assistant server that compares versions of a virtual assistant comprising a processor and a memory. The memory coupled to the processor is configured to be capable of executing programmed instructions stored in the memory to receive a selection of at least two versions of a virtual assistant for comparison from a client device. Metadata corresponding to each component of the at least two versions is then compared. Based on the compared metadata, a list of components of the at least two versions and a type of change made to one or more components of the list of components is presented to the client device. A selection corresponding to one or more components of the list of components is received from the client device. Subsequently, a comparison of definitions of the at least two versions of the selected one or more components of the list of components is presented to the client device.

In another example, the present disclosure relates to a non-transitory computer readable storage medium having stored thereon instructions for comparing versions of a virtual assistant which when executed by a processor, causes the processor to perform steps comprising: receiving a selection of at least two versions of the virtual assistant for comparison from a client device. Metadata corresponding to each component of the at least two versions is then compared. Based on the compared metadata, a list of components of the at least two versions and a type of change made to one or more components of the list of components is presented to the client device. A selection corresponding to one or more components of the list of components is received from the client device. Subsequently, a comparison of definitions of the at least two versions of the selected one or more components of the list of components is presented to the client device.

DETAILED DESCRIPTION

Examples of the present disclosure relate to a virtual assistant server environment and, more particularly, to one or more components, systems, computer-readable media and methods for comparing versions of a virtual assistant. The virtual assistant server environment enables users such as developers or administrators operating a client device to, by way of example, design, develop, deploy, manage, or analyze virtual assistants. The users may mark specific stages of the virtual assistant development as versions for, by way of example, a) creating a version of the virtual assistant before making additional changes, b) preserving a fully tested version until a production release while continuing to work on changes, c) keeping a track of the changes made to the virtual assistant, d) reverting to a previous version of the virtual assistant to manage issues created by the changes, or the like. To manage these requirements, the virtual assistant server environment enables the users to, by way of example, a) create different versions of the virtual assistant, b) view, manage, or compare different versions of the virtual assistant, c) restore the virtual assistant to a previous version, or the like.

Figure 1:
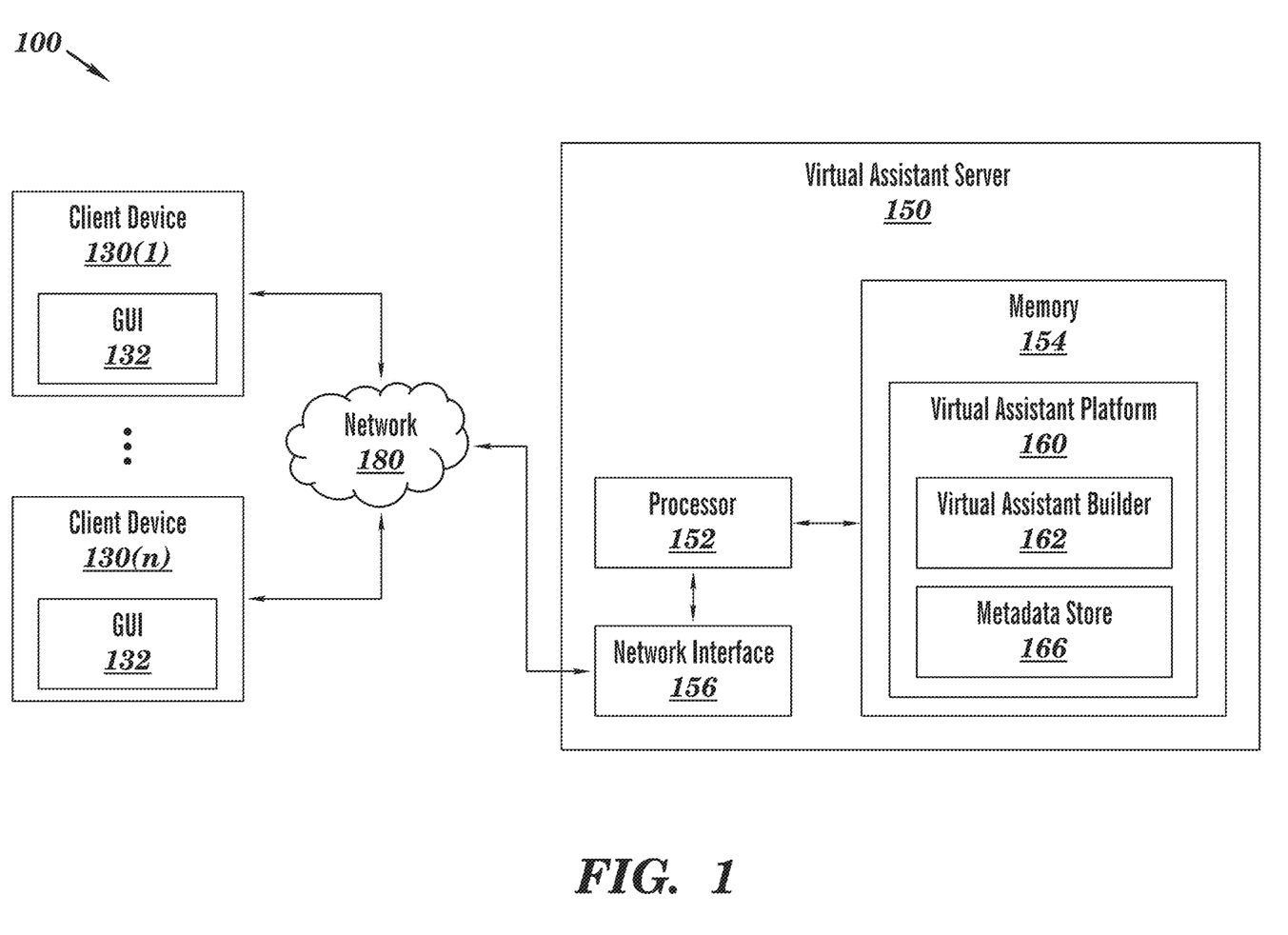
FIG. 1 is a block diagram of an exemplary virtual assistant server environment for implementing the concepts and technologies disclosed herein.

FIG. 1 is a block diagram of an exemplary virtual assistant server environment 100 for implementing the concepts and technologies disclosed herein. The environment 100 includes: a plurality of client devices 130(1)-130(n), and a virtual assistant server 150 coupled together via a network 180, although the environment 100 can include other types and numbers of systems, devices, components, and/or elements and in other topologies and deployments. While not shown, the exemplary environment 100 may include additional network components, such as routers, switches and other devices, which are well known to those of ordinary skill in the art and thus will not be described here.

The virtual assistant server 150 includes a processor 152, a memory 154, and a network interface 156, although the virtual assistant server 150 may include other types and/or numbers of components in other configurations. In addition, the virtual assistant server 150 may include an operating system (not shown). In one example, the virtual assistant server 150 and/or processes performed by the virtual assistant server 150 may be implemented using a networking environment (e.g., cloud computing environment). In one example, the described methods performed by the virtual assistant server 150 may be offered as a service by the cloud computing environment.

The components of the virtual assistant server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these.

The processor(s) 152 of the virtual assistant server 150 may execute one or more non-transitory computer-executable instructions stored in the memory 154 for the methods illustrated and described with reference to the examples herein, although the processor can execute other types and numbers of instructions and perform other types and numbers of operations. The processor(s) 152 may comprise one or more central processing units (CPUs), or general-purpose processors with a plurality of processing cores, such as Intel® processor(s), AMD® processor(s), although other types of processor(s) could be used in other configurations.

The memory 154 of the virtual assistant server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 may include instructions corresponding to a virtual assistant platform 160 and a metadata store 166 of the virtual assistant server 150, although other types and/or numbers of instructions in the form of programs, functions, methods, procedures, definitions, subroutines, or modules may be stored. The virtual assistant server 150 receives communication from the plurality of client devices 130(1)-130(n) and uses the virtual assistant platform 160 to provide a response to the communication. The metadata store 166 may include key-value pairs corresponding to data or configuration of virtual assistants created using the virtual assistant platform 160.

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the virtual assistant server 150 and the network 180. The network interface 156 may support wired or wireless communication. In one example, the network interface 156 may include an Ethernet adapter or a wireless network adapter to communicate with the network 180.

The plurality of client devices 130(1)-130(n) may communicate with the virtual assistant server 150 via the network 180. The users at one or more of the client devices 130(1)-130(n) may access and interact with the functionalities exposed by the virtual assistant server 150 via the plurality of client devices 130(1)-130(n). The plurality of client devices 130(1)-130(n) can include any type of computing device that can facilitate user interaction, for example, a desktop computer, a laptop computer, a tablet computer, a smartphone, a mobile phone, a wearable computing device, or any other type of device with communication and data exchange capabilities. The plurality of client devices 130(1)-130(n) may include software and hardware capable of communicating with the virtual assistant server 150 via the network 180. Also, the plurality of client devices 130(1)-130(n) may render and display the information received from the virtual assistant server 150, by way of example, to render an interface which the users may use to configure the virtual assistants. The plurality of client devices 130(1)-130(n) and the virtual assistant server 150 may communicate via one or more application programming interfaces (APIs) or one or more hyperlinks exposed by the virtual assistant server 150.

The users, such as developers, administrators, or business analysts by way of example, may operate one or more of the plurality of client devices 130(1)-130(n) to interact with the virtual assistant server 150 via the network 180. The plurality of client devices 130(1)-130(n) may be, for example, a desktop computer, a laptop computer, a tablet computer, a smartphone, a mobile phone, or any other type of device with communication and data exchange capabilities. Also, the plurality of client devices 130(1)-130(n) comprise a graphical user interface (GUI) 132 that may render and display data received from the virtual assistant server 150. The plurality of client devices 130(1)-130(n) may run applications such as web browsers or virtual assistant software, which may render the GUI 132, although other applications may render the GUI 132. In one example, the users may, by way of example, make selections, provide inputs using the GUI 132 or interact, by way of example, with data, icons, widgets, or other components displayed in the GUI 132.

The plurality of client devices 130(1)-130(n) may include one or more processors, one or more memories, one or more input devices such as a keyboard, a mouse, a display device, a touch interface, and/or one or more communication interfaces, which may be coupled together by a bus or other link, although each may have other types and/or numbers of other systems, devices, components, and/or other elements.

The network 180 may enable the plurality of client devices 130(1)-130(n) or other external systems to communicate with the virtual assistant server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 180 may also support standards and/or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the virtual assistant server 150 may include any interface that is suitable to connect with any of the above-mentioned network types and communicate using any of the above-mentioned network protocols.

Figure 2A:
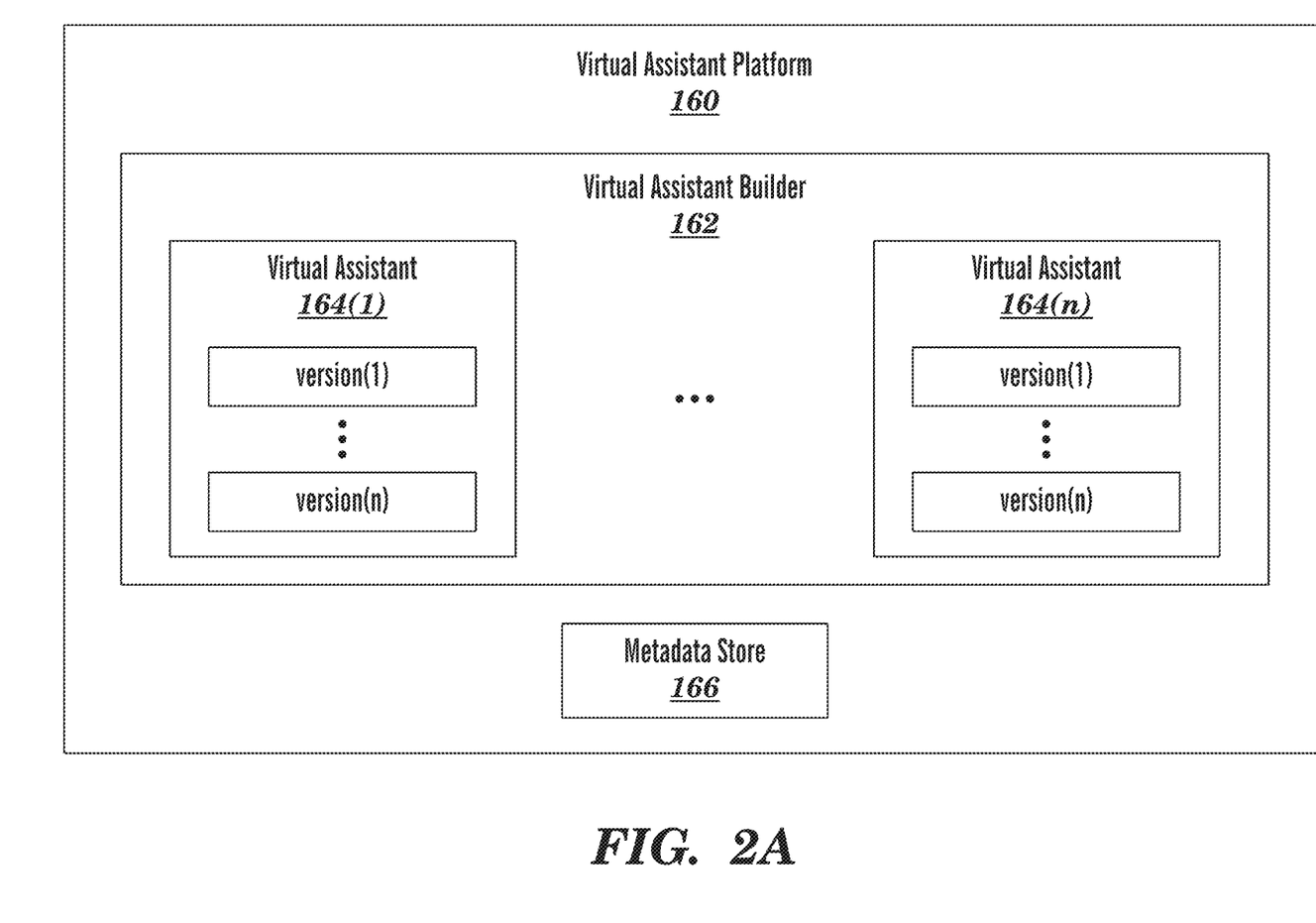
FIG. 2A is a block diagram of a virtual assistant platform of the virtual assistant server environment illustrated in FIG. 1.

FIG. 2A is a block diagram of the virtual assistant platform 160 of the virtual assistant server environment 100 illustrated in FIG. 1. The virtual assistant platform 160 includes a virtual assistant builder 162 used to design, develop, deploy, manage, or analyze a plurality of virtual assistants 164(1)-164(n), although other types and/or numbers of applications or software may be developed in other configurations. The virtual assistant platform 160 manages and stores data or configuration corresponding to the plurality of virtual assistants 164(1)-164(n). The virtual assistant platform 160 includes natural language and/or artificial intelligence capabilities and the plurality of virtual assistants 164(1)-164(n) may be configured to communicate with the customers of the enterprises in natural language, by way of example, via voice or text. The virtual assistant platform 160 also enables the users to develop process applications, data tables, or the like. The virtual assistant platform 160 may include a conversation engine (not shown) which executes the configured plurality of virtual assistants 164(1)-164(n).

Figure 2B:
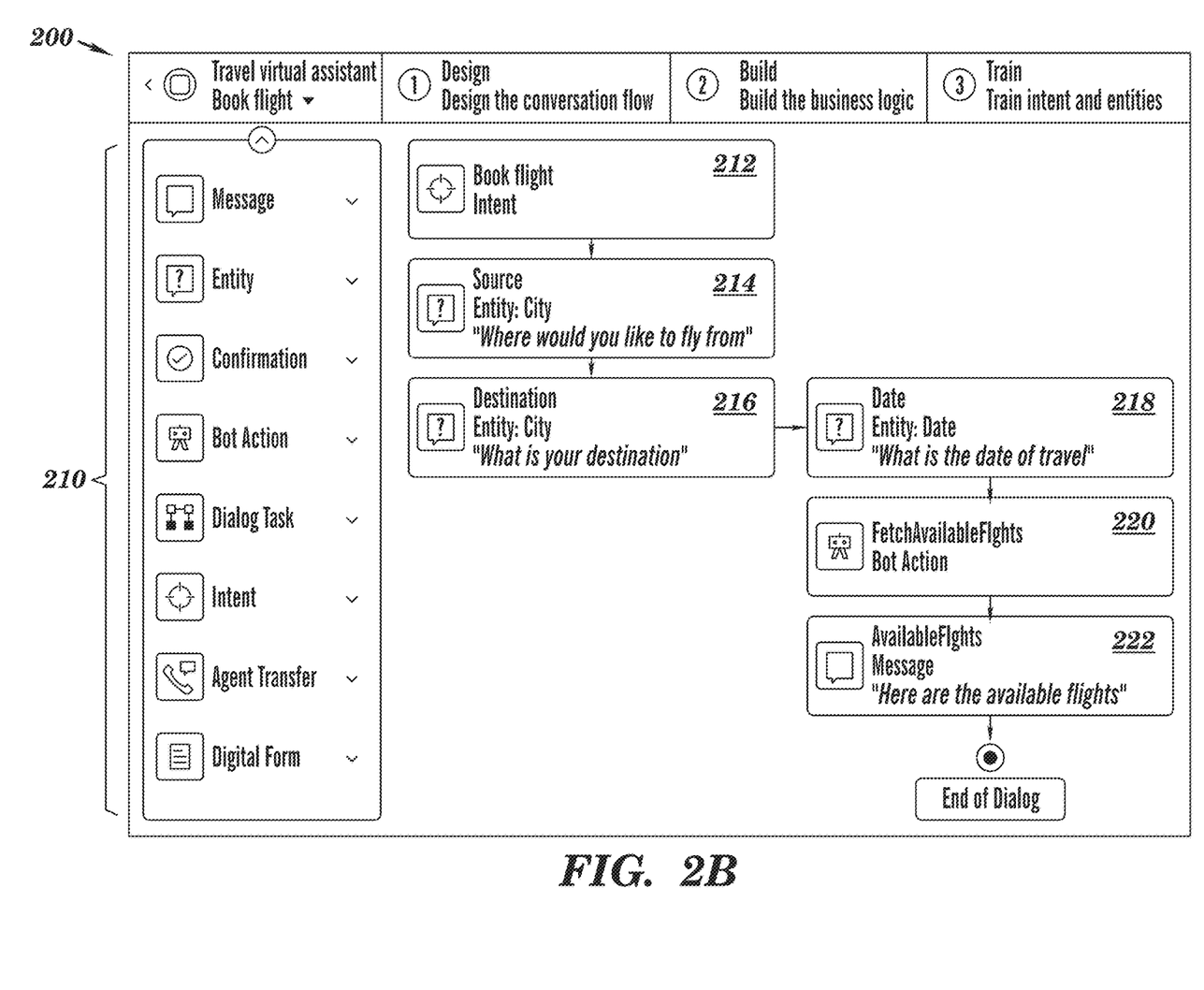
FIG. 2B is an example dialog task corresponding to a "book flight" intent of a travel virtual assistant configured by an enterprise user using the virtual assistant platform.

The users of the plurality of client devices 130(1)-130(n) may design, develop, deploy, manage, or analyze one or more of the plurality of virtual assistants 164(1)-164(n) using the virtual assistant builder 162. The users may use the virtual assistant builder 162 to configure each of the plurality of virtual assistants 164(1)-164(n) using dialog tasks, neural networks, or artificial intelligence based definitions, models, or instructions. An example of a dialog task of a virtual assistant created using the virtual assistant builder 162 is illustrated in FIG. 2B. In one example, the user may create a dialog task for each intent supported by the virtual assistant 164(1). The intent refers to an intention of the customer— that describes what the customer wants the virtual assistant to do. For example, different dialog tasks defined for a travel virtual assistant may correspond to the intents—book flight, book train, book lounge, book cab, book hotel, or the like. In one example, the dialog tasks may comprise components, such as nodes by way of example, connected using conditions that define a sequence of steps to be executed to fulfil the intent of the customer conversing with the virtual assistant 164(1).

The users may create versions (e.g. version(1)-version(n)) for each of the plurality of virtual assistants 164(1)-164(n). In one example, the user may create a version(1) and subsequently make changes to the version(1) to create version(2). Subsequently, the same user or a different user, using the GUI 132, may compare version(1) and version(2) to view and understand the changes between the version(1) and version(2). The virtual assistant platform 160 provides: a version level, a component level, a property level, or a definition level comparison of version(1) and version(2), which may be, by way of example, displayed in the GUI 132, although other types and/or numbers of comparison may be provided in other configurations.

In one example, the version level comparison may comprise providing an overview of the changes between at least two versions of the virtual assistant. The component level comparison may comprise providing changes corresponding to each component of the at least two versions of the virtual assistant. The property level comparison may comprise providing the changes made to properties of a component between at least two versions of the virtual assistant. The definition level comparison may comprise providing the changes between at least one or more parts of definitions of two versions of the virtual assistant. In one example, the virtual assistant platform 160 may also provide a textual summary of a version level, a component level, a property level, or a definition level comparison between at least two versions of the virtual assistant.

The virtual assistant platform 160 stores metadata corresponding to the plurality of virtual assistants 164(1)-164(n) in the metadata store 166, although the metadata can be stored in other components in other configurations. The virtual assistant platform 160 may also store metadata corresponding to each version of one or more of the virtual assistants 164(1)-164(n). In one example, the virtual assistant platform 160 creates metadata files corresponding to version(1)-version(n) of the virtual assistant 164(1). The metadata files may comprise metadata corresponding to each component of the version(1)-version(n) of the virtual assistant 164(1). The metadata corresponding to each component comprises a unique identifier of the component, a component name, a component type, a definition of the component, or a shortened definition of the component, although other types and/or numbers of metadata may be stored in other configurations.

The virtual assistant platform 160 may manage and store a definition of each of the plurality of virtual assistants 164(1)-164(n) created using the virtual assistant builder 162. The definitions may include code or instructions corresponding to the plurality of virtual assistants 164(1)-164(n), in the form of programs, functions, methods, procedures, subroutines, or the like. The virtual assistant platform 160 may retrieve data, properties or configuration from an application database (not shown) to create definitions of the plurality of virtual assistants 164(1)-164(n). In one example, the definitions may be stored in the form of database tables, JavaScript Object Notation (JSON) files, extensible markup language (XML) files, or other such data structures. In another example, the data, properties or configuration corresponding to the plurality of virtual assistants 164(1)-164(n) may be stored in the application database which may be part of the memory 154 or external to the memory 154. The data, properties, or configuration may change as the user modifies the plurality of virtual assistants 164(1)-164(n) using the virtual assistant builder 162. The data, properties, or configuration may be stored as objects in the application database.

The definitions may also include data, properties, or a configuration for the plurality of virtual assistants 164(1)-164(n), such as virtual assistant names, intent names of the virtual assistant, node names of the intents, node transitions, interruption behaviors, entity names, entity settings, error prompts or entity prompts by way of example, to be sent by the plurality of virtual assistants 164(1)-164(n) to the customers, code and/or data of API configurations, information retrieval settings from internal or third-party databases, third party integrations, API call configurations, although other types and/or numbers of data, properties, or configuration may be defined. The definition of each component of the plurality of virtual assistants 164(1)-164(n) may be a subset of the definitions of the plurality of virtual assistants 164(1)-164(n).

FIG. 2B illustrates an example dialog task of a "book flight" intent 200 of a travel virtual assistant configured by the user using the virtual assistant platform 160. The user may use user interface (UI) components, code, or a combination of these provided by the virtual assistant platform 160 to create and configure virtual assistants, although other types and/or numbers of methods may be used in other configurations. Each virtual assistant of the plurality of virtual assistants 164(1)-164(n) may include one or more intents and each intent may be configured using UI components such as nodes 210. The types of nodes 210 provided by the virtual assistant platform 160 include: an intent node, an entity node, a confirmation node, a bot action node, or a message node, although other types and/or numbers of nodes 210 may be added in other configurations. The user may configure the virtual assistant by connecting and configuring two or more of the nodes 210. The intent of the utterance refers to the intention of the customer—that describes what the customer wants the virtual assistant to do. The entities are, for example, parameters, fields, data, or words required by the virtual assistant to fulfill the intent. For example, in the utterance—"Book me a flight to Orlando for next Sunday", the intent is "Book flight", and the entities are "Orlando" and "Sunday".

The "book flight" intent 200 is configured using nodes such as intent node—book flight 212, entity nodes—source 214, destination 216, date 218, a bot action node—FetchAvailableFlights 220, and a message node—AvailableFlights 222. The virtual assistant platform 160 traverses the above-mentioned nodes when the "book flight" intent 200 is determined in the utterance provided by a customer interacting with the travel virtual assistant.

The entities of the entity nodes—source 214 and destination 216 may be of the entity type—city. The entity—date 218 may be of the entity type—date. The entity nodes are configured to determine a configured entity type and a corresponding entity value from the utterance. The bot action node—FetchAvailableFlights 220 is configured to make an API call to an internal repository or an external service such as, for example, a travel website, to fetch information about available flights between the source 214 and the destination 216 on the date 218. The message node—AvailableFlights 222 is configured to output information to the customer (in this example information retrieved by the API call).

Each of the nodes 210 may have properties including component properties, natural language properties, intelligence properties, connection properties, Application programming interface (API) configuration properties, interactive voice response (IVR) properties, or the like.

Figure 3:
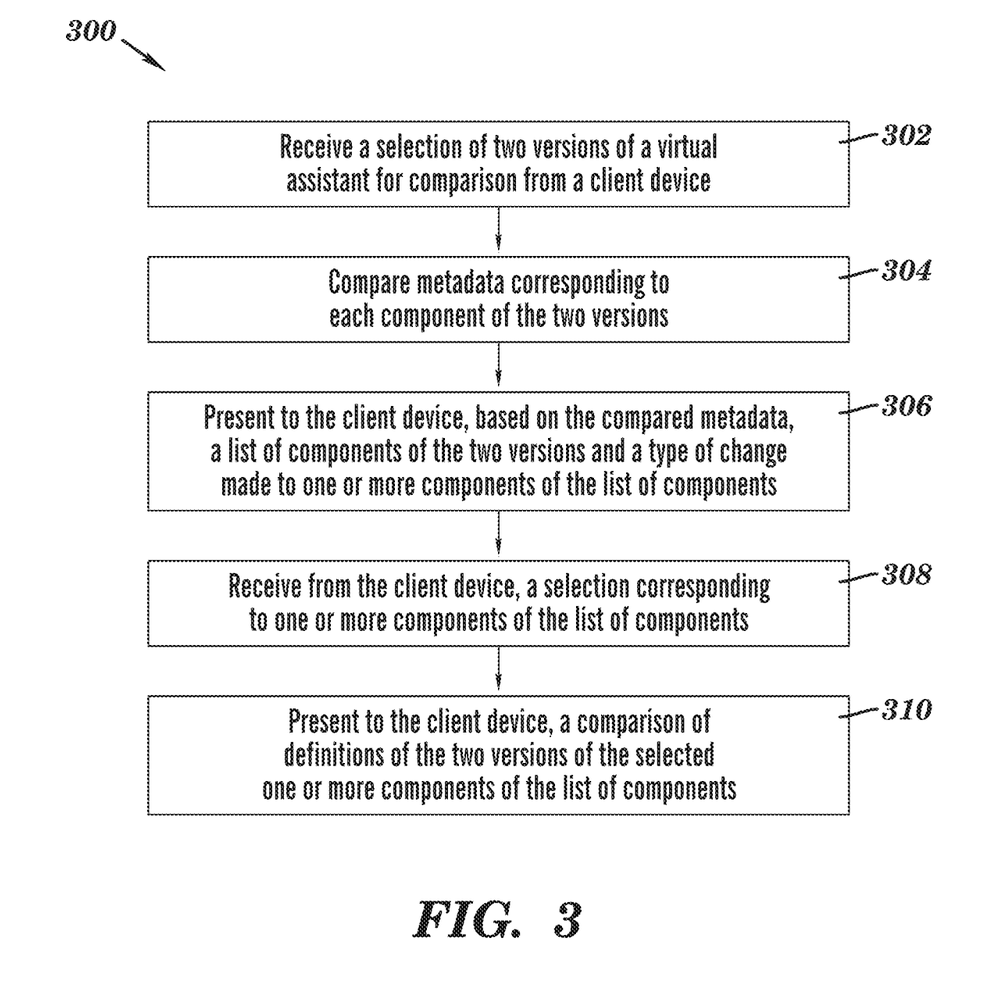
FIG. 3 is a flowchart of an exemplary method for comparing versions of a virtual assistant created using interfaces provided by the virtual assistant platform.

FIG. 3 is a flowchart of an exemplary method 300 for comparing versions of a virtual assistant created using interfaces provided by the virtual assistant server 150. The exemplary method 300 may be performed by the system components illustrated in the environment 100 of FIG. 1. In one example, a user operating the client device 130(1) using the GUI 132 may compare two versions of a virtual assistant 164(1). Although, comparison between two versions is described and illustrated, it may be understood that the virtual assistant server 150 may compare more than two versions using the described methods.

Figure 4A:
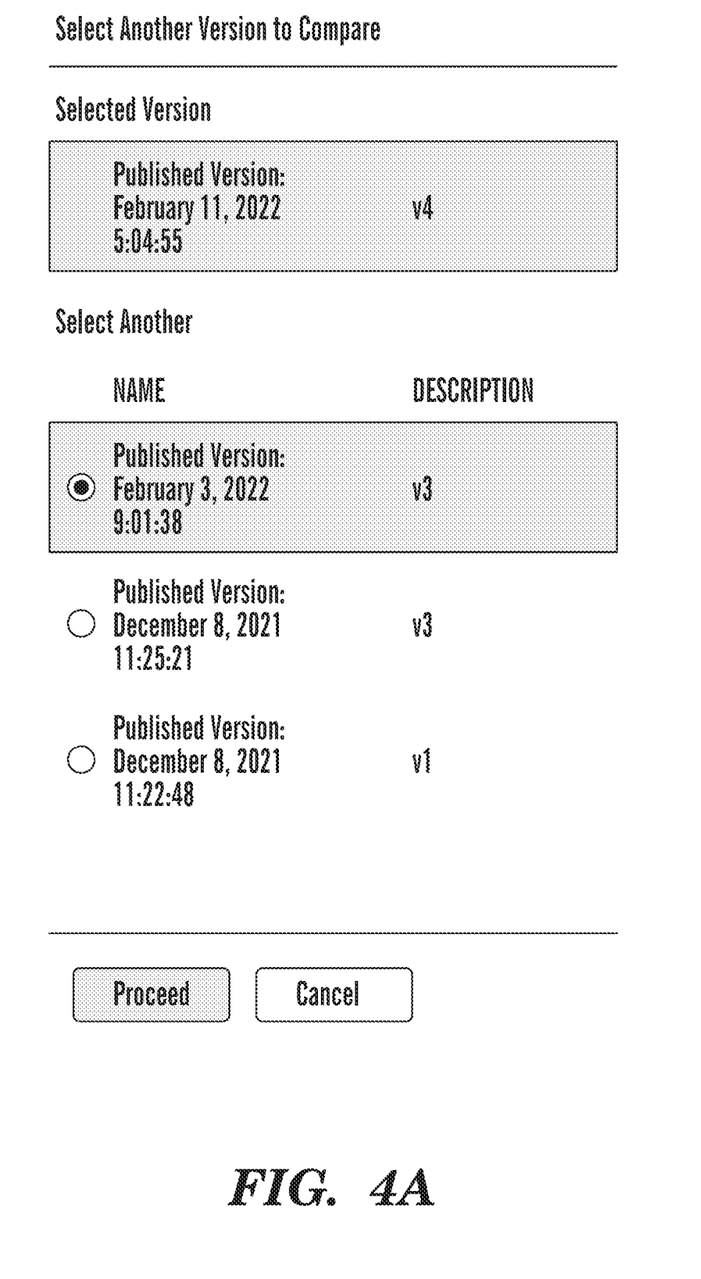
FIG. 4A is an example graphical user interface provided by the virtual assistant server to a client device for a user to select two versions of a virtual assistant for comparison.

At step 302, the virtual assistant server 150 receives a selection of two versions of the virtual assistant 164(1) for comparison from a client device 130(1). FIG. 4A is an example GUI 132 provided by the virtual assistant server 150 to the client device 130(1) for the user to select two versions of a virtual assistant for comparison. In one example, as illustrated in FIG. 4A, the user accessing the client device 130(1) may select the version(4) and the version(3) of the virtual assistant 164(1)—the travel virtual assistant, for comparison. The virtual assistant server 150 may receive the selection from the client device 130(1). The virtual assistant server 150 may denote version(3) as a base version and the version(4) as a target version for comparison. In other examples, the two versions for comparison may be automatically selected by the virtual assistant server 150, such as automatically selecting the current version of the virtual assistant 164(1) as the target version and the previous version of the virtual assistant 164(1) as the base version for comparison, although the virtual assistant server 150 can be configured to select other combinations of versions.

Figure 4B:
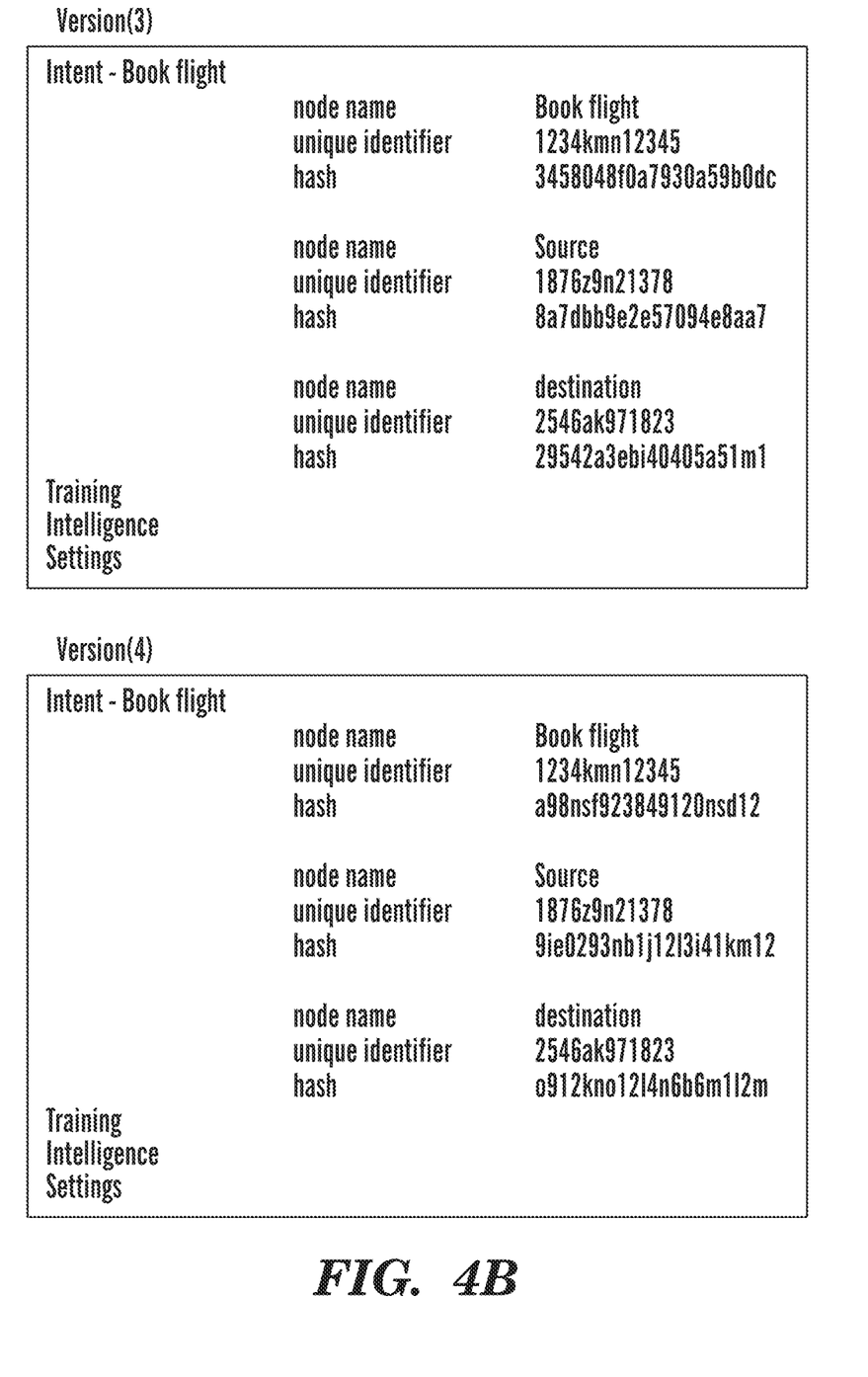
FIG. 4B comprises example metadata associated with two versions of the virtual assistant.

At step 304, the virtual assistant server 150 compares metadata corresponding to each component of the two versions of the virtual assistant 164(1). In this example, the virtual assistant 164(1) may include a "book flight" intent 200 described in FIG. 2B. FIG. 4B illustrates an example of metadata associated with two versions of the virtual assistant 164(1). In this example, the metadata store 166 includes metadata corresponding to the components (e.g. nodes) of the "book flight" intent 200 of the version(3) and the version(4) of the virtual assistant 164(1). The metadata stored in the metadata store 166 may be related to the properties of components of the plurality of virtual assistant 164(1)-164(n). The metadata illustrated in this example includes: node names, unique identifiers of nodes of the intent, and hashes of the definition of the nodes of the intent.

The virtual assistant server 150 may create the definitions of the version(3) and the version(4) of the virtual assistant 164(1) based on the data or configuration stored in the application database (not shown) corresponding to the virtual assistant 164(1). In one example, the definition of each component of the version(3) and the version(4) of the virtual assistant 164(1) may be created based on the data or configuration corresponding to the virtual assistant 164(1) stored in the application database (not shown). The virtual assistant server 150 may create metadata corresponding to each component of the version(3) and the version(4) of the virtual assistant 164(1). In one example, the virtual assistant server 150 may also create hashes, encoding, or encryption of the definitions of each component of the version(3) and the version(4) of the virtual assistant 164(1). The created metadata may be stored in the metadata store 166.

The virtual assistant server 150 compares the metadata corresponding to each component of the version(3) with each component of the version(4), although other types and/or numbers of comparisons may be made in other examples. Based on the comparison, the virtual assistant server 150 determine the changes made from the version(3) to the version(4). The virtual assistant server 150 may categorize the determined changes as, by way of example, additions, modifications, or deletions made to the version(3). In one example, the virtual assistant server 150 may compare the unique identifiers of components of the version(3) and the version(4) to identify added or deleted components. The virtual assistant server 150 may compare the hashes of components of the version(3) and the version(4) to determine modified components. If a hash of a component remains the same in the two versions, it may be understood that the component is not modified between the two versions.

In this example, the virtual assistant server 150, compares, by way of example, the unique identifiers and hashes of definitions of the nodes 212-216. As the unique identifiers are the same in the version(3) and the version(4), the virtual assistant server 150 determines that there are no additions or deletions from version(3) to version(4). However, as the hashes of the definitions of the nodes 212-216 are different, the virtual assistant server 150 determines that the nodes 212-216 are modified from the version(3) to the version(4).

The virtual assistant server 150 may also compare other metadata of the two versions of the virtual assistant 164(1) to determine changes such as additions, deletions, or modifications between the two versions. In one example, the virtual assistant server 150 may also compare the definitions of the nodes or other components to determine if the nodes or the other components are modified from the base version to the target version. In another example, the virtual assistant server 150 may encode, encrypt or modify the definitions of the components of the virtual assistant 164(1) to determine modifications between any two versions of the virtual assistant 164(1).

Figure 4C:
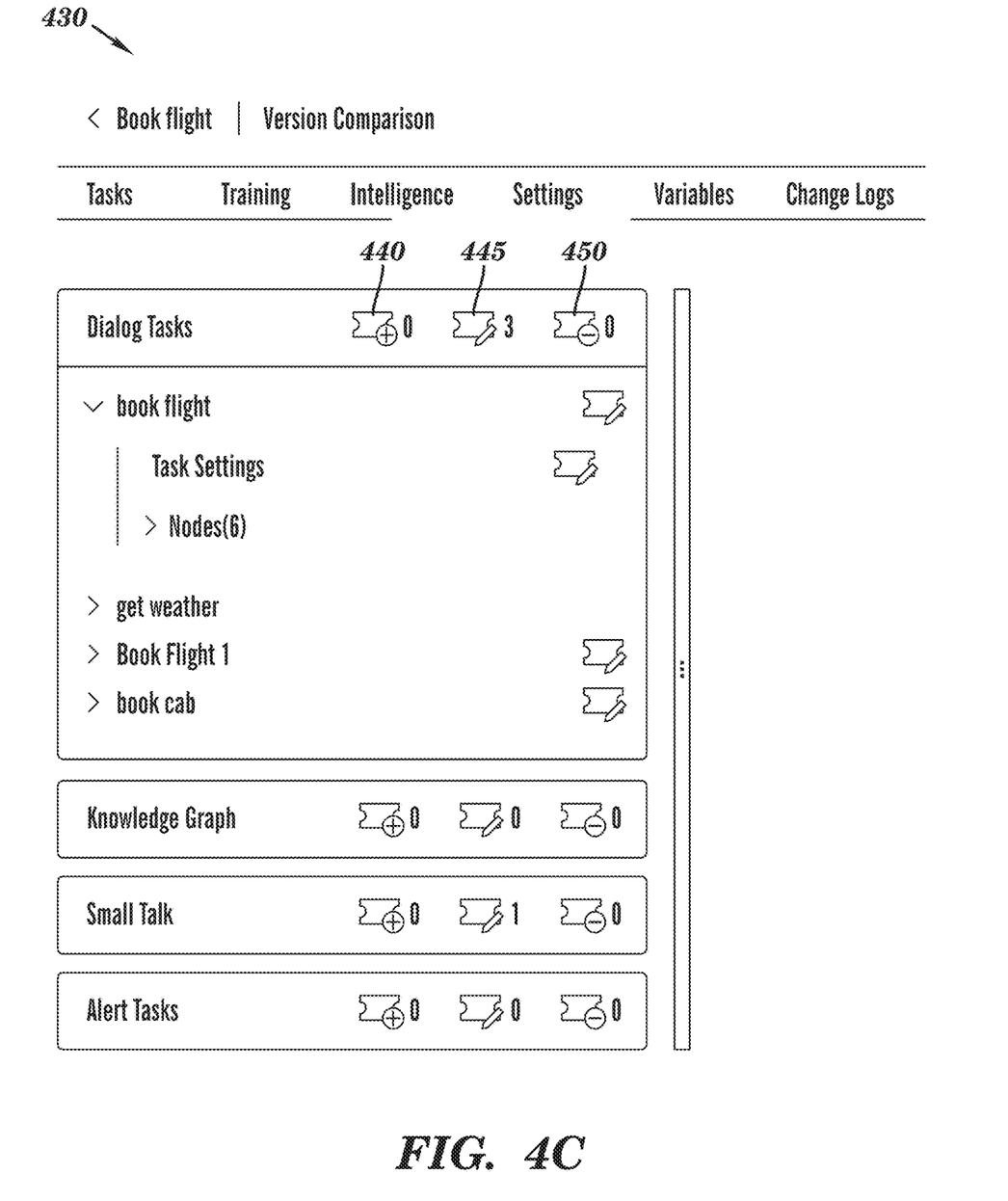
FIG. 4C is an example graphical user interface provided by the virtual assistant server illustrating a list of components of the two versions of the virtual assistant and human-readable markers indicating a type of change made to components of the virtual assistant.

At step 306, the virtual assistant server 150, presents to the client device 130(1), based on the compared metadata, a list of components of the two versions and a type of change made to one or more components in the list of components. FIG. 4C is an example GUI 132 provided by the virtual assistant server 150 illustrating a list of components 430 of the two versions of the virtual assistant 164(1) and human-readable markers (e.g. 440, 445, 450) indicating the type of change made to one or more components of the virtual assistant 164(1). In one example, displaying information in the GUI 132 may include the virtual assistant server 150 outputting instructions to the client device 130(1), and the client device 130(1) executing the instructions to render and display the information. In this example, the list of components 430 include: dialog tasks, nodes of dialog tasks, task settings, knowledge graph components, small talk components, training components, intelligence components, and settings and variables components. The human readable markers indicate a type of change such as an addition 440, modification 445, or deletion 450 to the one or more of the list of components 430.

At step 308, the virtual assistant server 150, receives from the client device 130(1), a selection corresponding to one or more components of the list of components. In this example, the user selects the human readable marker of the type—modification 445 corresponding to the node—source 214. The client device 130(1) transmits to the virtual assistant server 150 an indication of selection corresponding to the node—source 214.

Figure 4D:
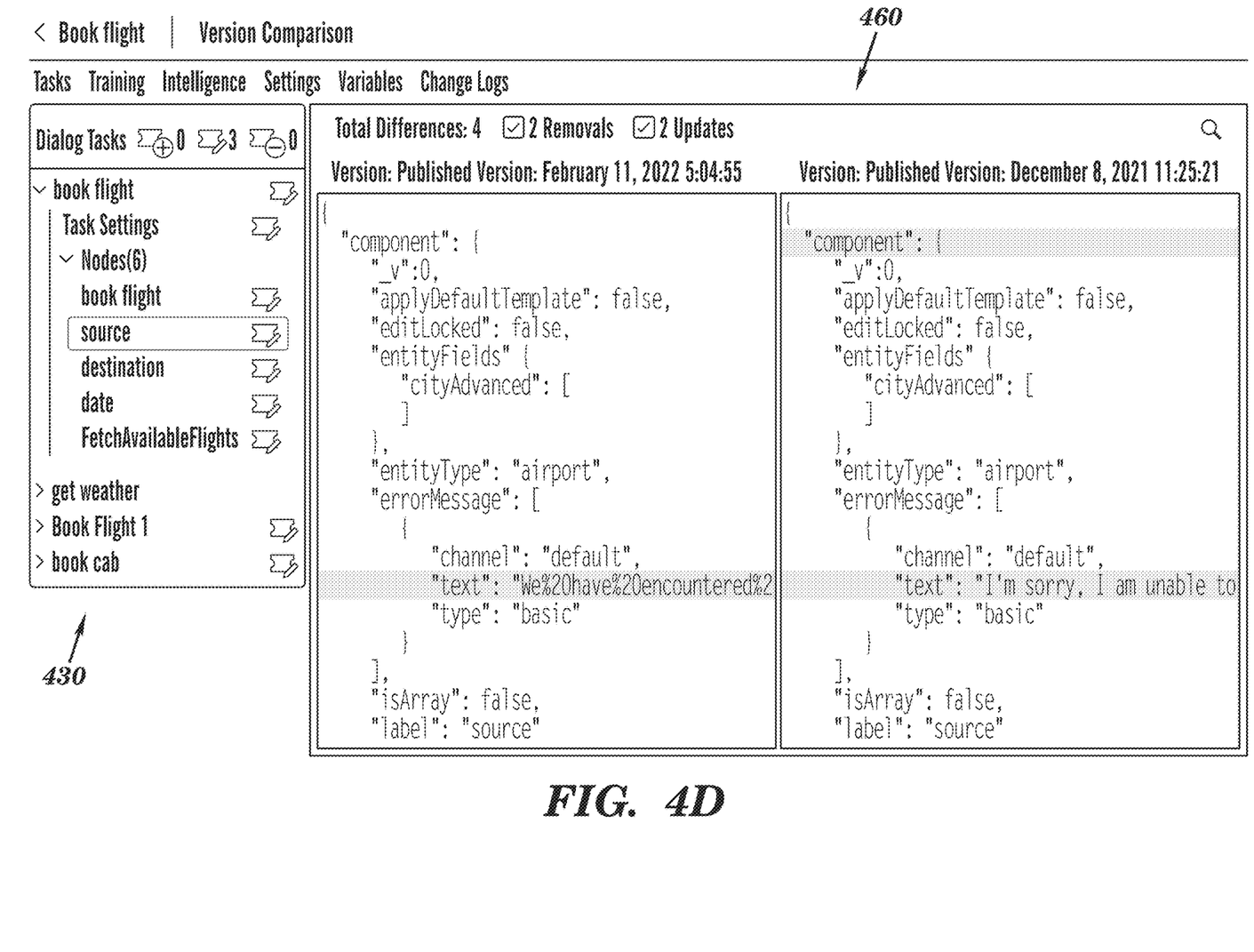
FIG. 4D is an example graphical user interface provided by the virtual assistant server illustrating a comparison of definitions of a component of the two versions of the virtual assistant.

At step 310, the virtual assistant server 150, presents to the client device 130(1), a comparison of definitions of the two versions of the selected one or more components of the list of components 430. In this example, the virtual assistant server 150 presents to the client device 130(1), a comparison of definitions of the version(3) and the version(4) of the node—source 214. FIG. 4D is an example GUI 132 provided by the virtual assistant server 150 illustrating a comparison of definitions 460 of the node—source 214 of the two versions—version(3) and version(4) of the virtual assistant 164(1). The virtual assistant server 150 may use a code comparison method to compare the definitions of the version (3) and the version(4) of the node—source 214. In one example, the virtual assistant server 150 uses a JSON comparison method and provides a JSON comparison file or a text comparison method and provides a text comparison file to the client device 130(1).

The virtual assistant server 150 also enables the user to approve or reject any changes made to the components of the plurality of virtual assistants 164(1)-164(n). In one example, the user may view the changes made to the version(3) illustrated in FIG. 4D, and approve a modification made to the node—source 214, but reject a modification made to the node—destination 216 using the interfaces provided by the virtual assistant server 150. In one example, when approved, the modification is pushed to the version(4) and when rejected the modification is not pushed to the version(4). In another example, the user may approve or reject changes made to intelligence components, such as interruption settings component or multi-intent detection component, training components, or the like.

For further illustration, the training components may, by way of example, include utterances, synonyms, patterns, or rules used for training the virtual assistant 164(1). For example, in the version(3) of the virtual assistant 164(1), the user may have added 30 utterances to train an natural language processing engine (not shown) of the virtual assistant 164(1). Subsequently, the user may have edited 20 of the 30 utterances in the version(4) of the "book flight" intent 200 of the virtual assistant 164(1). When the user selects the version(3) and the version(4) of the virtual assistant 164(1) in the GUI 132 for comparison, the virtual assistant server 150 receives the selection, compares the metadata corresponding to each component of the version(3) and the version(4), and determines that the training component of the "book flight" intent 200 is modified. The virtual assistant server 150 presents to the client device 130(1) that the training component is modified. The user may select the training component from the list of components 430 and the virtual assistant server 150 receives the selection of the training component.

Subsequently, the virtual assistant server 150 presents a comparison of definitions of the training component of the version(3) and the version(4) which includes the modified utterances. The user upon reviewing the modified training may reject the modifications made to the version(3) of the training component when upgrading the virtual assistant 164(1) to the version(4). In this manner, upon reviewing the modifications, the user may choose to restore individual components of the virtual assistant to a previous version.

Figure 4E:
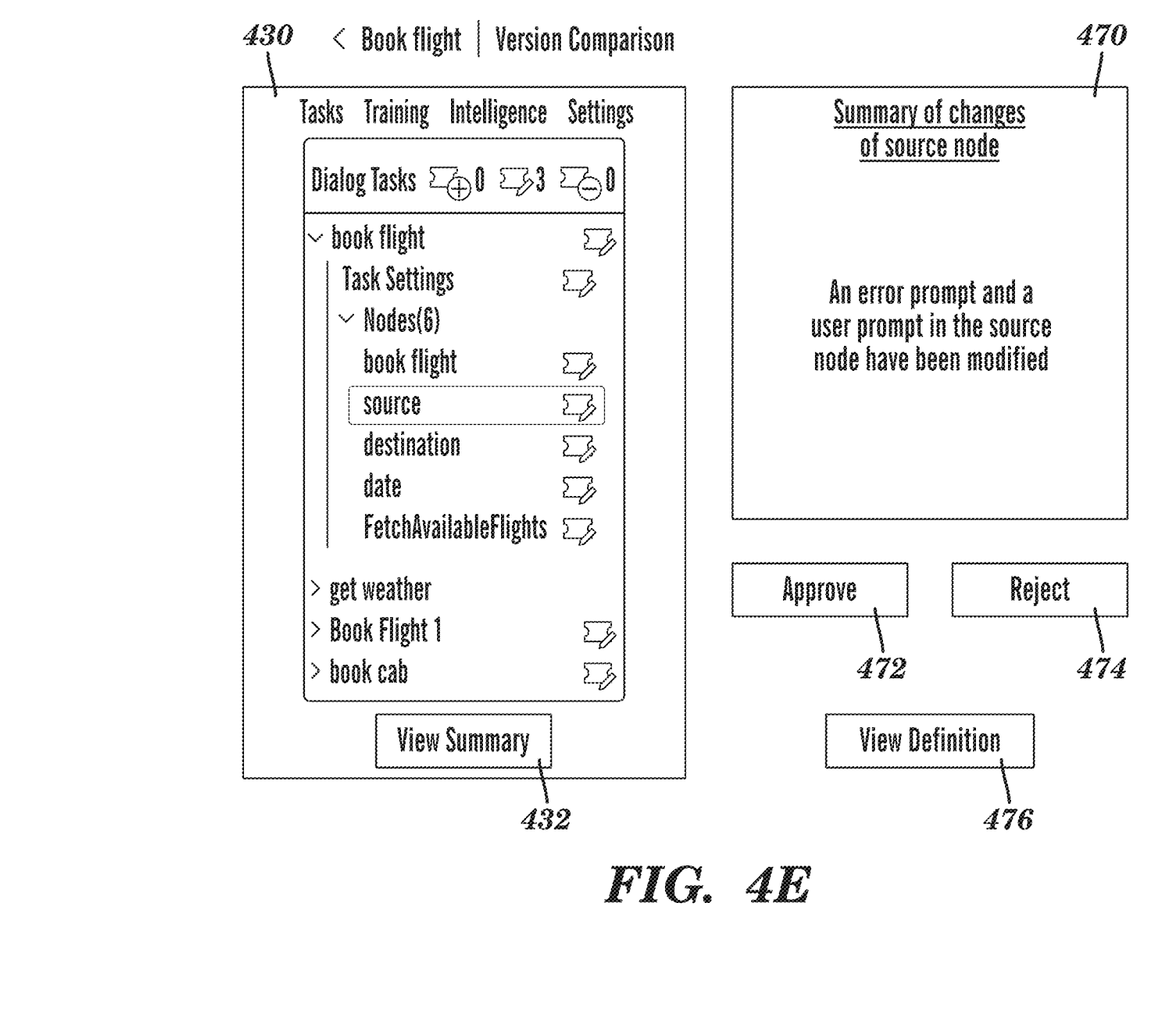
FIG. 4E is an example graphical user interface provided by the virtual assistant server illustrating a comparison of definitions and a summary of changes between two versions of a component of the virtual assistant.

FIG. 4E is an example GUI 132 provided by the virtual assistant server 150 illustrating a comparison of definitions 460 and a summary of changes 470 between two versions of the component—source 214 of the virtual assistant 164(1). The GUI 132 illustrated in FIG. 4E may be rendered by the client device 130(1) based on information provided by the virtual assistant server 150. The GUI 132 in this example comprises views of: the list of components 430, the definitions 460, or the summary of changes 470, although the GUI 132 may include other types and/or numbers of views in other configurations. The user may select one or more components of the list of components 430 and view different levels of comparison between the two versions of the selected one or more components of the virtual assistant 164(1). In one example, the views may cascade one after the other based on the user interaction with the GUI 132. In another example, the GUI 132 may comprise one or more of the list of components 430, the definitions 460, or the summary of changes 470. In one example, the list of components 430 may be displayed initially, and when the user selects "view summary" 432, the summary of changes 470 of the node—source 214 between the version(3) and the version(4) may be displayed in the GUI132.

The virtual assistant server 150 receives the selection of: the view summary 432 and the corresponding component— source 214, from the client device 130(1), and outputs a textual summary of the changes made to the node—source 214 to the client device 130(1). The textual summary of the changes may be displayed as the summary of changes 470 in the client device 130(1). The summary of changes 470 may include a textual summary of the changes made to the node—source 214 in natural language. In another example, the summary of changes 470 may list the properties of the node—source 214, which are modified between the version (3) and the version(4).

Subsequently, the user upon viewing the summary of changes 470 may select approve 472 to approve or reject 474 to reject the changes made to the node—source 214 from the version(3) to the version(4). The user may also select view definition 476, upon which the definitions 460 of the version (3) and the version(4) of the source 214, and a comparison of definitions of the version(3) and the version(4) of source 214 may displayed in the GUI 132. In one example, the virtual assistant server 150 may compare definitions of the version(3) and the version(4) of the node—source 214, when the user selects—view definition 476 in the GUI 132. In one example, the definitions of the version(3) and the version(4) of the node—source 214 may be stored separately in the memory 154 and used by the virtual assistant server 150 for comparison. In another example, the definitions of the version(3) and the version(4) of the node—source 214 may be extracted from the definitions of the version(3) and the version(4) of the virtual assistant 164(1) stored in the memory 154. The extracted definitions of the version(3) and the version(4) of the node—source 214 may be used by the virtual assistant server 150 for comparison. Based on the instructions provided by the virtual assistant server 150, the client device 130(1) may also display change markers 462, 464 in the GUI 132. The change markers 462, 464 enable the user to quickly select and view the changes in the definitions of the version(3) and the version(4) of the node—source 214.

The textual summary of the changes in natural language provides a human readable version of the changes between the two versions enabling not just software developers but also business users, and novice or intermediate users who are not familiar with software code to understand the changes between the two versions. In one example, the summary of changes 470 may provide easy understanding of changes between versions for a business user and the definitions 460 may provide sophisticated understanding of the changes between the versions required by a software developer. Further, the views of: the list of components 430, the definitions 460, or the summary of changes 470, provides comparison of the changes between the two versions at a: version level, a component level, a property level, or a definition level. The multiple level comparison provides a detailed understanding of the changes between the two versions of the virtual assistant.

Users may compare two versions of the virtual assistant to determine if there are intent detection, or version compatibility issues in the newer version of the two versions. For example, the user may check if deploying the newer version of the virtual assistant to a production environment causes conflicts in intent detection, forward or backward compatibility, or the like. The selection of the two versions of the virtual assistant for comparison may be performed at one of the plurality of client devices 130(1)-**130(*n*) when the new version of the virtual assistant is published or deployed. For example, when the user publishes the version(4) of the virtual assistant 164(1), the user may choose to compare the version(4) with the version(3). In another example, when the user publishes the version(4), the virtual assistant server 150 may automatically compare the version(4) with the version (3) and provide insights to the user. The virtual assistant server 150 may compare definitions the version(4) and the version(3) of the virtual assistant 164(1) using one or more validations such as, by way of example, training validations or flow validations. Subsequent to the one or more validations, the virtual assistant server 150 may provide a summary of the impact of any changes between the version(3) and the version(4) of the virtual assistant 164(1) to the client device 130(1) which may be displayed, for example, in the UI component—summary of changes 470. The version(3) may comprise 20 training utterances and the version(4) may comprise 40 training utterances. The virtual assistant server 150 upon comparing the metadata of each component of the version(3) and the version(4) at step 304, may determine that there is an addition of configuration in the version(4). The virtual assistant server 150 may perform the steps 306, 308, and at step 310, upon receiving a selection of the training component from the client device 130(1), the virtual assistant server 150 compares the definitions of the training components of the version(3) and the version(4) of the virtual assistant 164(1)**.

The comparison may determine that training utterances are added to the version(4). Further, the comparison may comprise a training validation which uses the historical customer utterances received by the version(3) of the virtual assistant 164(1) after deployment, as a test suite on the version(4) of the virtual assistant 164(1). This training validation determines if changes to the training between the version(3) and version(4) of the virtual assistant 164(1) caused any changes in intent detection capabilities of the virtual assistant 164(1). For example, the virtual assistant server 150 determines the number of historical customer utterances for which the intent was detected by the version (3) of the virtual assistant 164(1). Subsequently, the historical customer utterances are used as a test suite on the version(4) of the virtual assistant 164(1), and the virtual assistant server 150 determines the number of historical customer utterances for which the intent was detected by the version(4) of the virtual assistant 164(1).

Based on the number of historical customer utterances for which the intent detection is made by the version(3) and version(4) of the virtual assistant 164(1), a summary of the impact of changes between the version(3) and the version(4) is presented to the client device 130(1). For example, the virtual assistant server 150, may determine that the added training utterances improved intent identification accuracy by 5% and provide this information in natural language to the client device 130(1) to be displayed in the summary of changes 470. The summary of the impact of changes may also comprise statements in natural language such as— "Based on analysis of historical customer data, the version (4) would increase intent detection by 4%", "Based on analysis of historical test suites, the version(4) would increase ambiguity in intent detection by 6%", or the like.

The training validation may also use test suites run on the version(3) of the virtual assistant 164(1) to test the version (4) of the virtual assistant 164(1). Subsequently, based on running the test suite(s)—the virtual assistant server 150 may determine how the added training utterances to the version(4) impacted the intent identification of the virtual assistant 164(1). The users may use this additional information to determine if the added training information may be approved or rejected. The summary of the impact of changes enables the users to make informed decisions when publishing or deploying a new version of the virtual assistant.

In another example, the virtual assistant server 150 may upon comparing the metadata of each component of the version(3) and the version(4) at step 304, determine that configuration is added to the version(4). The virtual assistant server 150 may perform the steps 306, 308, and at step 310, upon receiving a selection of the "variable" component from the client device 130(1), the virtual assistant server 150 compares the definitions of the "variable" components of the version(3) and the version(4) of the virtual assistant 164(1). The comparison may determine that a variable is added to the version(4) of the virtual assistant 164(1). Further, the comparison may comprise a flow validation which determines if the added variable already exists in the definition of the version(3) or if the added variable is a new variable. For example, the virtual assistant server 150, may determine that the added variable is a new variable and provide this information in natural language to the client device 130(1) to be displayed in the summary of changes 470. The users may use this additional information to determine if the change may be approved or rejected, and approve or reject the change using interfaces, for example, illustrated in FIG. 4E.

For further illustration, in virtual assistant development, two developers may work on creating two dialog tasks of the virtual assistant such as the dialog task illustrated in FIG. 2B. The two developers may test the created dialog tasks separately. However, the two developers may not have tested if the created dialog tasks cause any conflicts with other dialog tasks of the virtual assistant. In such examples, the administrator may check, when publishing or deploying the new version, if there are any conflicts because of the created dialog tasks. The virtual assistant server 150 using the above described methods, compares the new version of the virtual assistant with a previous version of the virtual assistant and provides information to the administrator on any conflicts or issues determined in the new version of the virtual assistant.

Having thus described the basic concept of the invention, it will be rather apparent to those skilled in the art that the foregoing detailed disclosure is intended to be presented by way of example only, and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   receiving, by a virtual assistant server, a selection of at least two versions of a virtual assistant for comparison from a client device;
   comparing, by the virtual assistant server, metadata corresponding to each user-interface component of dialog flows of the at least two versions metadata retrieved from a database;
   presenting, by the virtual assistant server, to the client device, based on the compared metadata, a unified named list of user-interface components of the dialog flows of the at least two versions and a type of change made to one or more user-interface components of the unified named list of components;
   receiving, by the virtual assistant server, from the client device, a selection corresponding to one or more user-interface components of the unified named list of user-interface components;
   automatically generating, by the virtual assistant server, a natural language summary of changes made to the selected one or more user-interface components of the unified named list of user-interface components; and
   presenting, by the virtual assistant server, instructions to a graphical user interface at the client device to provide the generated natural language summary of changes made to the selected one or more user-interface components and a comparison of configuration definitions of the at least two versions of the selected one or more user-interface components of the unified named list of components.

2. The method of claim 1, wherein the at least two versions comprise a base version of the virtual assistant and a target version of the virtual assistant.

3. The method of claim 1, wherein the configuration definitions of each user-interface component of the dialog flows of the at least two versions are a subset of configuration definitions of the dialog flows of the at least two versions.

4. The method of claim 1, wherein the metadata corresponding to each user-interface component comprises a unique identifier of the user-interface component, a component name, a component type, and a shortened configuration definition of the user-interface component.

5. The method of claim 4, wherein the shortened configuration definition of the user-interface component is created using hashing, encoding, or encryption of configuration definition of the user-interface component.

6. The method of claim 1, wherein the unified named list of user-interface components comprises a list of node names of dialog task components, training components, intelligence components, or settings and variables components.

7. The method of claim 1, wherein the type of change comprises: an addition, a deletion, or a modification of the one or more user-interface components of the unified named list of components.

8. A virtual assistant server comprising:
a processor; and
a memory coupled to the processor which is configured to be capable of executing programmed instructions stored in the memory to:
receive a selection of at least two versions of a virtual assistant for comparison from a client device;
compare metadata corresponding to each user-interface component of dialog flows of the at least two versions retrieved from a database;
present to the client device, based on the compared metadata, a unified named list of user-interface components of the dialog flows of the at least two versions and a type of change made to one or more user-interface components of the unified named list of components;
receive from the client device, a selection corresponding to one or more user-interface components of the unified named list of user-interface components;
automatically generate a natural language summary of changes made to the selected one or more user-interface components of the unified named list of user-interface components; and
present to the client device, instructions to a graphical user interface at the client device to provide the generated natural language summary of changes made to the selected one or more user-interface components and a comparison of configuration definitions of the at least two versions of the selected one or more user-interface components of the unified named list of components.

9. The virtual assistant server of claim 8, wherein the at least two versions comprise a base version of the virtual assistant and a target version of the virtual assistant.

10. The virtual assistant server of claim 8, wherein the configuration definitions of each user-interface component of the dialog flows of the at least two versions are a subset of configuration definitions of the dialog flows of the at least two versions.

11. The virtual assistant server of claim 8, wherein the metadata corresponding to each user-interface component comprises a unique identifier of the user-interface component, a component name, a component type, and a shortened configuration definition of the user-interface component.

12. The virtual assistant server of claim 11, wherein the shortened configuration definition of the user-interface component is created using hashing, encoding, or encryption of configuration definition of the user-interface component.

13. The virtual assistant server of claim 8, wherein the unified named list of user-interface components comprises a list of node names of dialog task components, training components, intelligence components, or settings and variables components.

14. The virtual assistant server of claim 8, wherein the type of change comprises: an addition, a deletion, or a modification of the one or more user-interface components of the unified named list of components.

15. A non-transitory computer-readable medium having stored thereon instructions which when executed by a processor, causes the processor to:
receive a selection of at least two versions of a virtual assistant for comparison from a client device;
compare metadata corresponding to each user-interface component of dialog flows of the at least two versions retrieved from a database;
present to a graphical user interface at the client device, based on the compared metadata, a unified named list of user-interface components of the dialog flows of the at least two versions and a type of change made to one or more user-interface components of the unified named list of components;
receive from the client device, a selection corresponding to one or more user-interface components of the unified named list of user-interface components;
automatically generate a natural language summary of changes made to the selected one or more user-interface components of the unified named list of user-interface components; and
present to the client device, instructions to a graphical user interface at the client device to provide the generated natural language summary of changes made to the selected one or more user-interface components and a comparison of configuration definitions of the at least two versions of the selected one or more user-interface components of the unified named list of components.

16. The non-transitory computer-readable medium of claim 15, wherein the at least two versions comprise a base version of the virtual assistant and a target version of the virtual assistant.

17. The non-transitory computer-readable medium of claim 15, wherein the configuration definitions of each user-interface component of the dialog flows of the at least two versions are a subset of configuration definitions of the dialog flows of the at least two versions.

18. The non-transitory computer-readable medium of claim 15, wherein the metadata corresponding to each user-interface component comprises a unique identifier of the user-interface component, a component name, a component type, and a shortened configuration definition of the user-interface component.

19. The non-transitory computer-readable medium of claim 18, wherein the shortened configuration definition of the user-interface component is created using hashing, encoding, or encryption of configuration definition of the user-interface component.

20. The non-transitory computer-readable medium of claim 15, wherein the unified named list of user-interface components comprises a list of node names of dialog task components, training components, intelligence components, or settings and variables components.

21. The non-transitory computer-readable medium of claim 15, wherein the type of change comprises: an addition, a deletion, or a modification of the one or more user-interface components of the unified named list of components.

\* \* \* \* \*